US011458551B2

(12) United States Patent
Sai et al.

(10) Patent No.: US 11,458,551 B2
(45) Date of Patent: Oct. 4, 2022

(54) END MILL

(71) Applicant: Mitsubishi Hitachi Tool Engineering, Ltd., Tokyo (JP)

(72) Inventors: Takafumi Sai, Yasu (JP); Makoto Baba, Yasu (JP); Akira Tokuyama, Yasu (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 86 days.

(21) Appl. No.: 16/464,881

(22) PCT Filed: Nov. 30, 2017

(86) PCT No.: PCT/JP2017/043094
§ 371 (c)(1),
(2) Date: May 29, 2019

(87) PCT Pub. No.: WO2018/123428
PCT Pub. Date: Jul. 5, 2018

(65) Prior Publication Data
US 2019/0321897 A1    Oct. 24, 2019

(30) Foreign Application Priority Data
Dec. 26, 2016  (JP) .............................. JP2016-251238

(51) Int. Cl.
*B23C 5/10*          (2006.01)

(52) U.S. Cl.
CPC .............. *B23C 5/10* (2013.01); *B23C 5/1009* (2013.01); *B23C 2210/0435* (2013.01); *B23C 2210/40* (2013.01)

(58) Field of Classification Search
CPC .... B23C 2210/0485; B23C 2210/0435; B23C 2210/40; B23C 5/1009; B23C 5/10
See application file for complete search history.

(56) References Cited

U.S. PATENT DOCUMENTS 3,042,994 A * 7/1962 Ruggeberg ................ B23C 5/10
407/29.13
3,217,382 A * 11/1965 De Dobbelaere ...... B23D 71/00
407/29.13
(Continued)

FOREIGN PATENT DOCUMENTS

CN      102303159 A      1/2012
CN      102398068 A      4/2012
(Continued)

OTHER PUBLICATIONS

JPH11156621A, Google patent machine translation of JP-11156621-A (Year: 1999).*
(Continued)

*Primary Examiner* — Nicole N Ramos
(74) *Attorney, Agent, or Firm* — Locke Lord LLP

(57) ABSTRACT

The present invention provides an end mill including: a shaft-shaped end mill main body; a chip discharge groove extending from a leading end to a trailing end in an axial direction of the end mill main body; a bottom blade which is provided at a leading end portion in the axial direction of the end mill main body and has a spherical shape in which a rotation locus around the axis has a center on the axis; and an outer peripheral blade which is provided along the chip discharge groove, and in which a rotation locus around the axis is convex outward. A curvature radius of the rotation locus of the outer peripheral blade is larger than a curvature radius of the rotation locus of the bottom blade. A twist angle of the outer peripheral blade is 20° or more.

2 Claims, 4 Drawing Sheets

(56) References Cited

U.S. PATENT DOCUMENTS

| | | | | |
|---|---|---|---|---|
| 5,322,394 | A * | 6/1994 | Okanishi | B23C 5/10 407/32 |
| 8,186,914 | B2 * | 5/2012 | Matsunaga | B23C 5/10 407/57 |
| 9,227,253 | B1 * | 1/2016 | Swift | B23C 5/28 |
| 2007/0286691 | A1 * | 12/2007 | Glimpel | B23C 5/10 407/54 |
| 2008/0101877 | A1 * | 5/2008 | Engin | B23C 5/1009 407/30 |
| 2008/0206000 | A1 * | 8/2008 | Sasu | B23C 3/18 407/29.13 |
| 2009/0092452 | A1 * | 4/2009 | Sato | B23C 5/10 407/54 |
| 2012/0039677 | A1 * | 2/2012 | Davis | B23C 5/10 407/54 |
| 2012/0170984 | A1 * | 7/2012 | Azegami | B23C 5/1009 407/54 |
| 2013/0051937 | A1 * | 2/2013 | Volokh | B23C 5/1009 407/42 |
| 2013/0315681 | A1 * | 11/2013 | Volokh | B23C 5/12 407/53 |
| 2016/0303664 | A1 * | 10/2016 | Azegami | B23C 5/1009 |

FOREIGN PATENT DOCUMENTS

| | | | | |
|---|---|---|---|---|
| CN | 105473264 | A | | 4/2016 |
| GB | 2354728 | A | | 4/2001 |
| JP | 06-277926 | A | | 10/1994 |
| JP | 08252713 | A | * | 10/1996 ........... B23C 5/1009 |
| JP | 11-156620 | A | | 6/1999 |
| JP | 11-156621 | A | | 6/1999 |
| JP | 11156621 | A | * | 6/1999 ........... B23C 5/1009 |
| JP | 2003300112 | A | * | 10/2003 |
| JP | 2004001115 | A | | 1/2004 |
| JP | 2004141975 | A | * | 5/2004 |
| JP | 2006263870 | A | * | 10/2006 |
| JP | 2008044040 | A | * | 2/2008 |
| JP | 2008110472 | A | * | 5/2008 |
| JP | 2015080840 | A | | 4/2015 |
| KR | 20140102474 | A | * | 8/2014 ............... B23C 5/10 |
| WO | 2009/070424 | A1 | | 6/2009 |
| WO | 2016/136820 | A1 | | 9/2016 |
| WO | 2016/152611 | A1 | | 9/2016 |

OTHER PUBLICATIONS

JPH08252713A, Google patent machine translation of JP-0825713-A (Year: 1996).*
KR20140102474A, Google patent machine translation of KR-20140102474-A (Year: 2014).*
Office Action dated Mar. 11, 2020, issued for the Chinese patent application No. 201780079508.7 and an English translation of the Search Report.
Supplementary European Search Report dated Jul. 1, 2020, issued for European Patent Application No. 17889346.7.
International Search Report dated Mar. 6, 2018, issued for PCT/JP2017/043094 and English translation thereof.
Notice of Allowance dated Jul. 6, 2021, issued for Chinese Patent Application No. 201780079508.7 and English translation of the Search Report.
Office Action dated Mar. 25, 2022, issued for Japanese Patent Application No. 2018558935 and a partial English translation of Search Report.

* cited by examiner

END MILL

TECHNICAL FIELD

The present invention relates to an end mill.

Priority is claimed on Japanese Patent Application No. 2016-251238, filed Dec. 26, 2016, the content of which is incorporated herein by reference.

BACKGROUND ART

Among solid end mills used for wall surface finishing applications such as dies, a solid end mill in which the pick feed is increased by making the rotation locus of an outer peripheral blade into a large circular arc shape, and thereby improving machining efficiency (for example, see Patent Document 1).

CITATION LIST

Patent Literature

[Patent Document 1]
Japanese Unexamined Patent Application, First Publication No. Hei 11-156620

SUMMARY OF INVENTION

Technical Problem

In the above-described end mill, although high-efficiency machining is enabled, at the same time, it is required to improve the quality of the finished surface.

An object of the present invention is to provide an end mill capable of performing high-efficiency machining and obtaining a good finished surface.

Solution to Problem

According to an aspect of the present invention, there is provided an end mill including: a shaft-shaped end mill main body; a chip discharge groove extending from a leading end to a trailing end in an axial direction of the end mill main body; a bottom blade which is provided at the leading end portion in the axial direction of the end mill main body and has a spherical shape in which a rotation locus about the axis has a center on the axis; and an outer peripheral blade which is provided along the chip discharge groove, and in which a rotation locus around the axis is convex outward, wherein a curvature radius of the rotation locus of the outer peripheral blade is larger than a curvature radius of the rotation locus of the bottom blade, a twist angle of the outer peripheral blade is 20° or more, and a rake angle in a radial direction of the outer peripheral blade in a cross section orthogonal to the axis is −20° or more and 0° or less.

According to the above configuration, the curvature radius of the rotation locus of the outer peripheral blade is larger than the curvature radius of the rotation locus of the bottom blade, the twist angle of the outer peripheral blade is 20° or more, and the radial rake angle is set to a value of −20° or more and 0° or less. Thus, in addition to a reduction in the cutting load, the blade edge strength of the outer peripheral blade can be improved. Therefore, high efficiency machining is enabled, and a high-quality finished surface can be obtained.

In addition, since the bottom blade is a ball blade, wall surface finishing using the outer peripheral blade and corner finishing using the bottom blade can be performed with one end mill, and machining efficiency can be enhanced by process integration.

The end mill may be configured to have a shape in which an outer diameter of the outer peripheral blade decreases toward the leading end portion in the axial direction.

The thickness of the outer peripheral blade may be 70% or more and 85% or less of an outer diameter of the outer peripheral blade.

The twist angle of the outer peripheral blade in a cross section orthogonal to the axis may be 40° or more.

The rake angle in the radial direction of the outer peripheral blade may be −10° or more and −3° or less.

The curvature radius of the rotation locus of the outer peripheral blade may be 20 times or more and 30 times or less of a curvature radius of the rotation locus of the bottom blade.

Advantageous Effects of Invention

According to the present invention, there is provided an end mill capable of performing high-efficiency machining and obtaining a good finished surface.

DESCRIPTION OF EMBODIMENTS

Hereinafter, an end mill according to an embodiment of the present invention will be described with reference to the drawings.

An end mill 1 of the present embodiment is a cutting tool (rotating tool) that performs a cutting process (rotating process) such as, for example, a finishing process or a semi-finishing process on a work material made of a metal material or the like.

Figure 1:
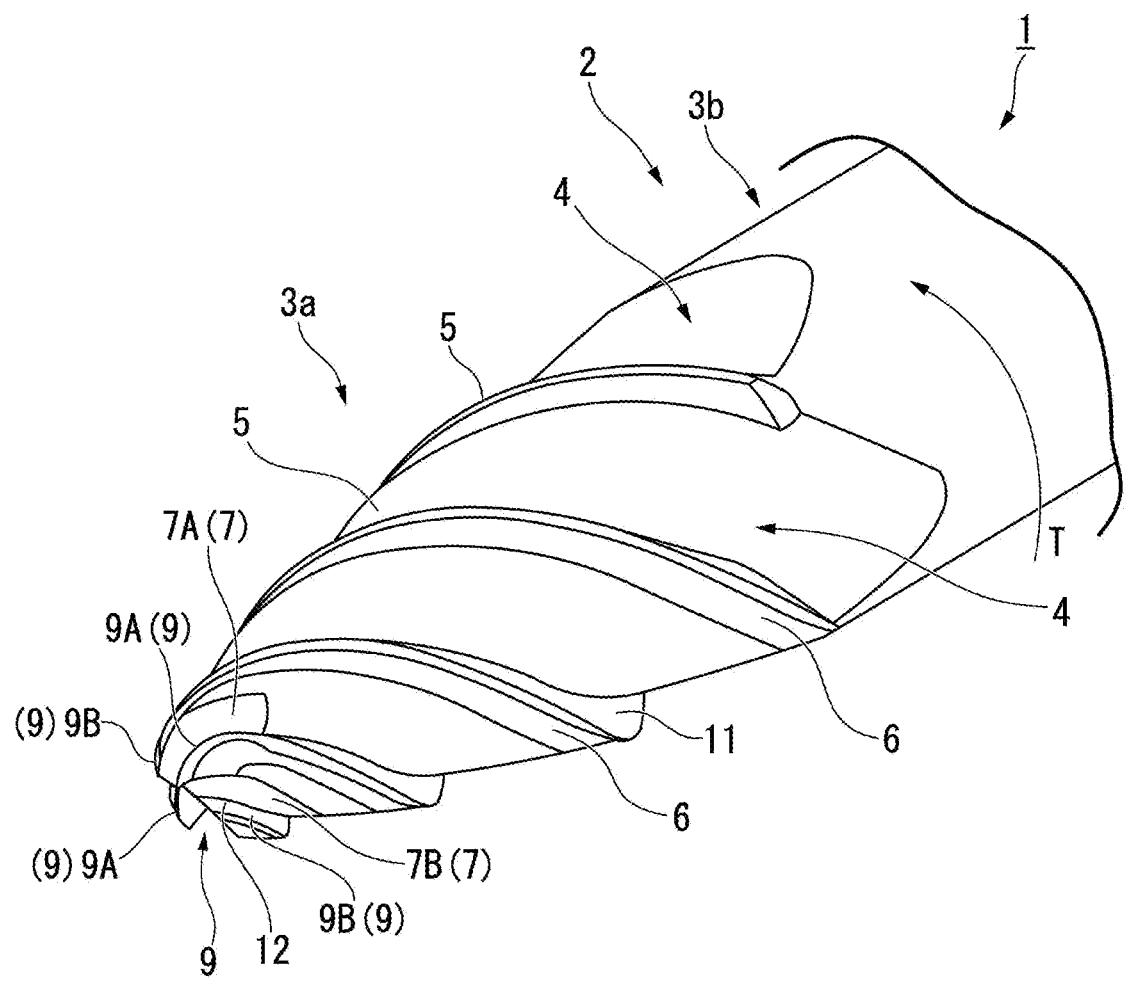
FIG. 1 is a perspective view showing an end mill of an embodiment.
Figure 2:
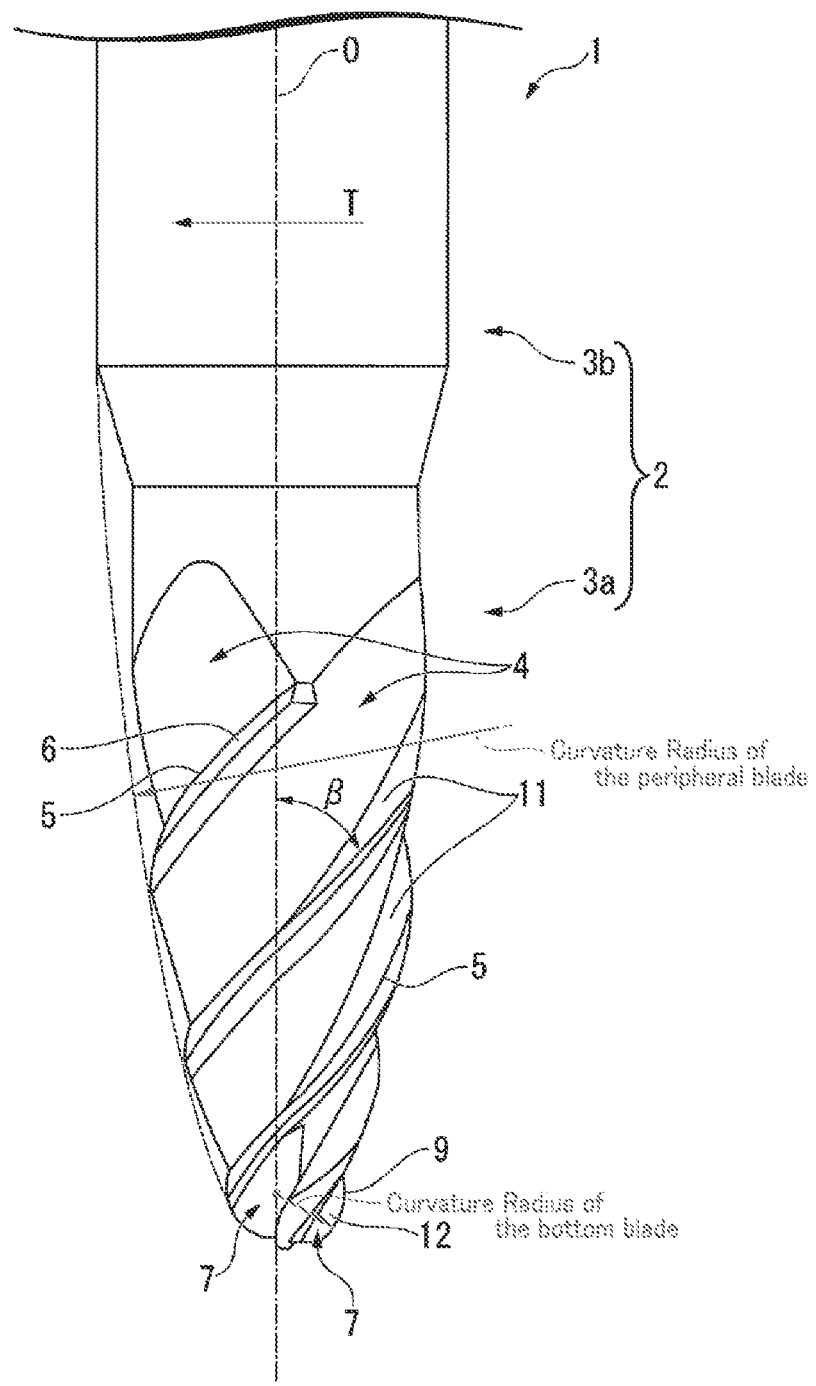
FIG. 2 is a side view of the end mill shown in FIG. 1.
Figure 3:
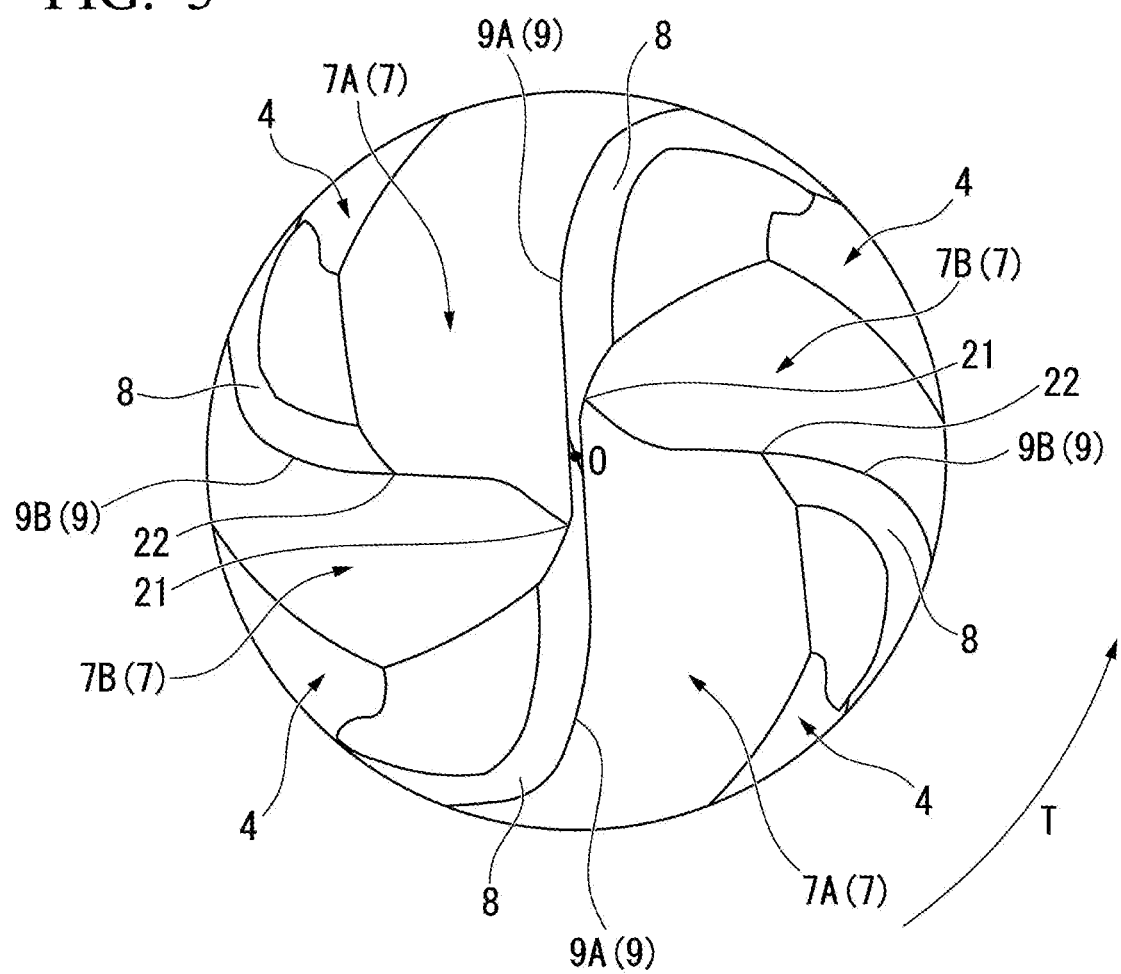
FIG. 3 is an axial front view showing only a bottom blade portion of the end mill.
Figure 4:
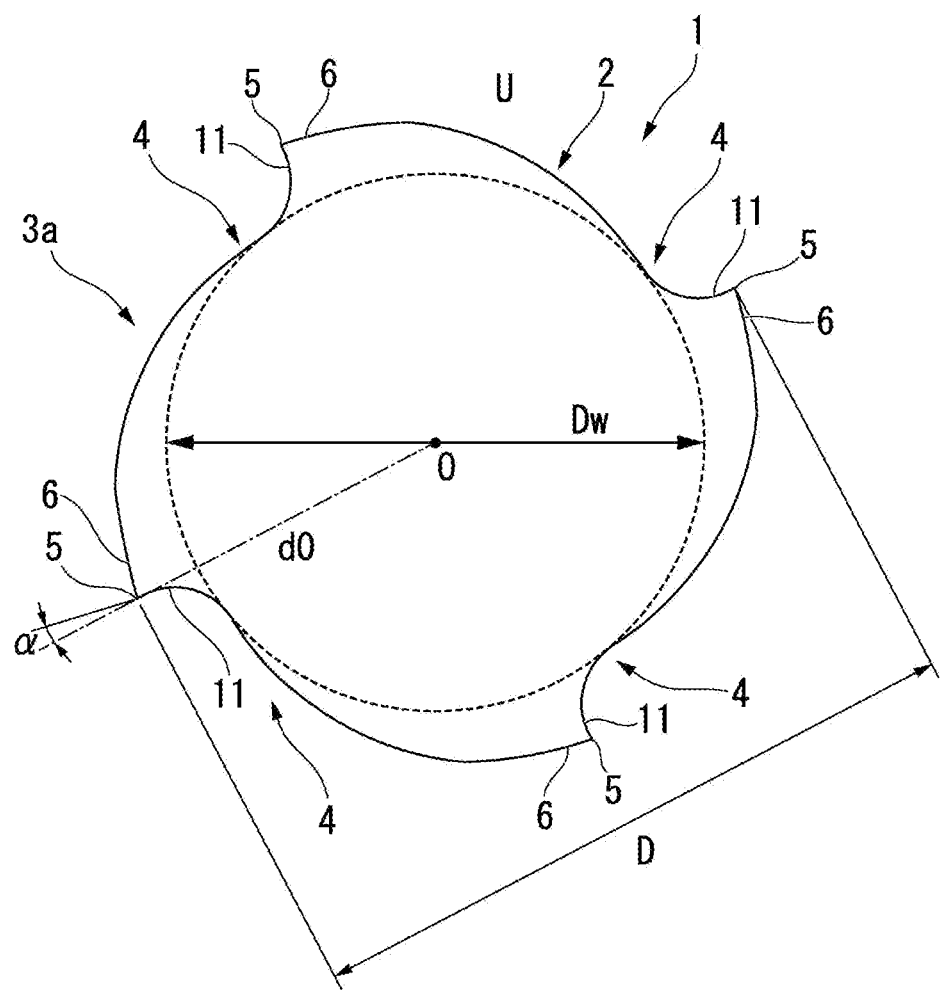
FIG. 4 is a cross-sectional view at a position of 5 mm from an end mill leading end.

FIG. 1 is a perspective view showing an end mill of the present embodiment. FIG. 2 is a side view of the end mill shown in FIG. 1. FIG. 3 is an axial front view showing only a bottom blade portion of the end mill. FIG. 4 is a cross-sectional view at a position of 5 mm from an end mill leading end.

As shown in FIGS. 1 to 3, the end mill 1 of the present embodiment has an axial shape. The end mill 1 has an end mill main body 2 made of, for example, cemented carbide or high-speed tool steel.

The end mill main body 2 has a substantially cylindrical shape, and a blade portion 3a is formed at a leading end portion of the end mill main body 2 along a direction of the axis O. A part of the end mill main body 2 other than the blade portion 3a is a shank portion 3b.

In the end mill 1, the cylindrical shank portion 3b of the end mill main body 2 is attached to a main shaft of a machine tool such as a machining center. The end mill 1 can be rotated in the direction of an end mill rotation direction T around the axis O by the main shaft. The end mill 1 performs cutting in the direction of the axis O and is fed in the radial direction orthogonal to the axis O along with the rotation, and cuts into the work material, thereby cutting the work material. The end mill 1 performs various kinds of machining such as curved surface machining, pocket machining, deep drilling, R machining (a convex R, and a concave R), and chamfering on a work material.

Specifically, the end mill 1 of the present embodiment is detachably mounted on a main shaft of a machine tool such as, for example, a machining center with multi-axis control in 3 to 6 axes, and is used for cutting the work material.

When the work material is cut by the end mill 1, coolant is supplied toward the blade portion 3a of the end mill 1 and the cutting surface (portion to be machined) of the work material. As the coolant, for example, an oil-based or water-soluble cutting fluid, compressed air or the like is used. The coolant may be supplied from the main shaft of the machine tool to the blade portion 3a and the machining surface through the inside of the end mill main body 2, or may be supplied from the outside of the end mill main body 2 to the blade portion 3a and the machining surface.

In the present embodiment, the direction along the axis O of the end mill main body 2 (a direction in which the axis O extends) is referred to as a direction of the axis O. Further, in the direction of the axis O, a direction from the shank portion 3b to the blade portion 3a is referred to as toward a leading end side, and a direction from the blade portion 3a to the shank portion 3b is referred to as toward a proximal end side.

Moreover, a direction orthogonal to the axis O is referred to as a radial direction. In the radial direction, a direction of approaching the axis O is referred to as inward in the radial direction, and a direction of moving away from the axis O is referred to as outward in the radial direction.

Further, a direction of rotation around the axis O is referred to as a circumferential direction. In the circumferential direction, a direction in which the end mill main body 2 is rotated by the main shaft of the machine tool at the time of cutting is referred to as an end mill rotation direction T, and an opposite rotation direction thereof is referred to as a side opposite to the end mill rotation direction T (an anti-end mill rotation direction).

A plurality of chip discharge grooves 4 are formed on an outer periphery of the blade portion 3a at intervals in the circumferential direction. In the present embodiment, the chip discharge grooves 4 are arranged at equal intervals in the circumferential direction. In the example of the present embodiment, four chip discharge grooves 4 are formed on the outer periphery of the blade portion 3a (see FIG. 3).

The chip discharge groove 4 extends in the circumferential direction from the leading end of the end mill main body 2 in the direction of the axis O toward the proximal end side. In the present embodiment, the chip discharge groove 4 opens to a leading end surface of the end mill main body 2 (a convex hemispherical surface facing the leading end side in the direction of the axis O in the blade portion 3a), is gradually twisted toward the opposite side of the end mill rotation direction T from the leading end surface toward the proximal end side, and extends in a spiral shape. The chip discharge groove 4 is cut up to the outer periphery of the end mill main body 2 at the end portion on the proximal end side of the blade portion 3a. In other words, in the end mill main body 2, a region in which the chip discharge groove 4 is formed along the direction of the axis O is taken as the blade portion 3a.

Each chip discharge groove 4 has a wall surface facing the end mill rotation direction T. In the wall surface of the chip discharge groove 4, a portion adjacent to the cutting blade is a rake surface. Specifically, in the rake surface of the cutting blade, portions adjacent to an outer peripheral blade 5 and a bottom blade 9 to be described later of the cutting blade are defined as the rake surface 11 of the outer peripheral blade 5 and the rake surface 12 of the bottom blade 9, respectively. The rake surface 12 of the bottom blade 9 is formed on a gash 7 of the chip discharge groove 4.

A groove-shaped gash 7 is formed at the leading end portion of the chip discharge groove 4 in the direction of the axis O. As shown in FIG. 3, in a front view of the end mill main body 2 when the end mill main body 2 is viewed from the leading end to the proximal end side in the direction of the axis O, the gash 7 extends in the radial direction. The radially inner end portion of the gash 7 is disposed in the vicinity of the axis O. The gash 7 gradually extends toward the proximal end side in the direction of the axis O from the radially inner end portion toward the radially outer side.

The number of gashes 7 corresponds to the number of chip discharge grooves 4, and four gashes 7 are formed in the example of this embodiment. A plurality of types of gashes 7A and 7B are included in the gashes 7 in accordance with the type of a bottom blade 9 (a first bottom blade 9A, and a second bottom blade 9B) to be described later. The details of the gashes 7A and 7B will be described later.

As shown in FIGS. 1 to 3, in the blade portion 3a, a plurality of cutting blades are formed at intervals in the circumferential direction. Each of the cutting blades has the outer peripheral blade 5 and the bottom blade 9. The cutting blade extends spirally around the axis O as a whole by connecting the outer peripheral blade 5 and the bottom blade 9 to each other. The number of cutting blades corresponds to the number of the chip discharge grooves 4, and in the example of the present embodiment, four cutting blades are provided. That is, the end mill 1 of the present embodiment is a four-blade end mill.

Among the cutting blades, the bottom blade (leading end blade) 9 is formed at a cross ridgeline between a wall surface facing the end mill rotation direction T of the gash 7 located at the leading end portion of the chip discharge groove 4 and the leading end surface of the end mill main body 2. The bottom blade 9 is a circular arc shaped ball blade that extends along the leading end outer peripheral edge of the wall surface of the gash 7 and protrudes toward the leading end outer peripheral side of the end mill main body 2 in a side view. The bottom blade 9 extends radially outward from the leading end (radially inner end) toward the proximal end side, and extends in the opposite direction to the end mill rotation direction T.

The bottom blade 9 is formed at a cross ridgeline between a rake surface 12 located at the end portion on the leading end outer peripheral side in the wall surface facing the end mill rotation direction T of the gash 7 and a leading end flank surface 8 adjacent to the opposite side to the end mill rotation direction T of the gash 7 in the leading end surface of the blade portion 3a.

On the leading end surface of the blade portion 3a, the leading end flank surface 8 is formed between adjacent gashes 7 (chip discharge grooves 4) in the circumferential direction. The leading end flank surface 8 is inclined toward the proximal end inner peripheral side from the bottom blade 9 to the opposite side to the end mill rotation direction T. A clearance angle is given to the bottom blade 9 by the inclination of the leading end flank surface 8.

A plurality of (four in the example of the present embodiment) bottom blades 9 are disposed at the leading end portion of the end mill main body 2 in the direction of the axis O at intervals around the axis O. Each of the plurality of bottom blades 9 has a convex circular arc shape, and has a semispherical shape in which the rotation locus around the axis O has a center on the axis O. The plurality of bottom blades 9 include a first bottom blade 9A and a second bottom blade 9B having different blade lengths.

A radially inward blade of the first bottom blade 9A has length, which is longer than that of the second bottom blade 9B. In a front view of the end mill main body 2 shown in FIG. 3, the first bottom blade 9A extends radially inward from a connecting portion with the outer peripheral blade 5 (the radially outer end edge of the first bottom blade 9A). The leading end 21 in the blade length direction of the first bottom blade 9A is disposed at a position beyond the axis O. That is, in the first bottom blade 9A, the leading end 21 in the blade length direction extending radially inward reaches the axis O and extends beyond the axis O. Further, in the present embodiment, the first bottom blade 9A does not pass immediately above the axis O, and two first bottom blades 9A are disposed to be misaligned with respect to each other with the axis O therebetween.

The second bottom blade 9B is adjacent to the first bottom blade 9A in the end mill rotation direction T, and has a shorter blade length than the first bottom blade 9A directed inward in the radial direction. In a front view of the end mill main body 2 shown in FIG. 3, the second bottom blade 9B extends radially inward from a connecting portion with the outer peripheral blade 5 (a radially outer end edge of the second bottom blade 9B). A leading end 22 of the second bottom blade 9B in the blade length direction is disposed at a position not exceeding the axis O. That is, the leading end 22 in the blade length direction extending radially inward of the second bottom blade 9B does not reach the axis O.

In the present embodiment, two sets of the first bottom blade 9A and the second bottom blade 9B are provided to be 180° rotationally symmetrical around the axis O.

At the leading end portion of the end mill main body 2, the gashes 7 are disposed adjacent to the plurality of bottom blades 9 in the end mill rotation direction T, respectively. The plurality of gashes 7 include a plurality of kinds of gashes having different lengths (groove lengths) from each other, and more specifically, the gash 7A of the first bottom blade 9A and the gash 7B of the second bottom blade 9B are included.

In the present embodiment, two sets of the gash 7A of the first bottom blade 9A and the gash 7B of the second bottom blade 9B are provided to be 180° rotationally symmetrical around the axis O.

In front view of the end mill main body 2 shown in FIG. 3, the length of the gash 7B of the second bottom blade 9B is shorter than the length of the gash 7A of the first bottom blade 9A. The gash 7A of the first bottom blade 9A and the gash 7B of the second bottom blade 9B communicate with each other.

The gash 7A of the first bottom blade 9A and the gash 7B of the second bottom blade 9B are partitioned by a boundary line extending in the radial direction at the leading end portion of the end mill. The boundary line extends inward from the leading end 22 of the second bottom blade 9B and reaches the leading end 21 in the blade length direction extending radially inward of the first bottom blade 9A.

The boundary line for partitioning the gash 7A of the first bottom blade 9A and the gash 7B of the second bottom blade 9B forms a ridge that protrudes toward the leading end side. That is, the boundary line is located on the leading end side of the gashes 7A and 7B. Thus, it is difficult for the chips formed by the bottom blade to move to the leading end side, and as a result, the chips are rapidly discharged to the proximal end side through the gashes In addition, it is preferable that the boundary line itself for partitioning the gash 7A of the first bottom blade 9A and the gash 7B of the second bottom blade 9B draws a concave ridgeline toward the proximal end side from the leading end side. As a result, chip discharging properties are further enhanced, and the risk of tool damage due to chip clogging can be further reduced.

As shown in FIGS. 1 and 2, in the cutting blade, the outer peripheral blade 5 is formed in the cross ridgeline between the wall surface facing the end mill rotation direction T in a portion (a portion located on the side closer to the proximal end than the gash 7) other than the gash 7 of the chip discharge groove 4 and the outer peripheral surface of the end mill main body 2. The outer peripheral blade 5 is connected to a radially outer end edge of the bottom blade 9 (the end edge is also an end edge of the proximal end side of the bottom blade 9), and extends toward the proximal end side in the direction of the axis O from the end blade. Specifically, the outer peripheral blade 5 extends to the side opposite to the end mill rotation direction T from the end portion connected to the bottom blade 9 to the proximal end side.

The outer peripheral blade 5 is formed in the cross ridgeline between the rake surface 11 located at the radially outer end portion among the wall surfaces of the chip discharge groove 4 facing the end mill rotation direction T in the portion other than the gap 7 and an outer peripheral flank surface 6 adjacent to the opposite side to the end mill rotation direction T of the chip discharge groove 4 among the outer peripheral surfaces of the blade portion 3a.

On the outer peripheral surface of the blade portion 3a, the outer peripheral flank surface 6 is formed between the chip discharge grooves 4 adjacent to each other in the circumferential direction. The outer peripheral flank surface 6 is inclined radially inward in the radial direction from the outer peripheral blade 5 toward the opposite side to the end mill rotation direction T. A clearance angle is given to the outer peripheral blade 5 by the inclination of the outer peripheral flank surface 6.

A plurality (four in the example of the present embodiment) of outer peripheral blades 5 are disposed on the outer periphery of the end mill main body 2 at intervals around the axis O and extend substantially in parallel to each other. Each of the outer peripheral blades 5 is connected to the radially outer end edge of the bottom blade 9 having the corresponding circumferential position. In the present embodiment, the plurality of outer peripheral blades 5 are disposed at equal pitches around the axis O.

In the end mill 1 of the present embodiment, an outer diameter of the outer peripheral blade 5 (a diameter of the circumferential surface formed by the rotation locus of the outer peripheral blade 5) is gradually increased in the direction of the axis O from the leading end toward the proximal end. An enlargement ratio of the outer diameter of the outer peripheral blade 5 gradually decreases from the leading end to the proximal end side.

Further, a rotation locus (a locus shown by a two-dot chain line in FIG. 2) obtained by rotating the plurality of outer peripheral blades 5 around the axis O is a circular arc shape protruding outward in the radial direction. The rotation locus of the outer peripheral blade 5 is smoothly connected to the rotation locus obtained by rotating the plurality of bottom blades 9 around the axis at the leading end of the outer peripheral blade 5. That is, the rotation locus of the outer peripheral blade 5 and the rotation locus of the bottom blade 9 form a uniform curve in which no step or unevenness occurs at the connection portion between the rotation loci. Therefore, in the end mill 1 of the present embodiment, the rotation locus of the outer peripheral blade 5 has an oval shape.

In addition, in the end mill of this embodiment, the outer peripheral blade in which the rotation locus around an axis makes a barrel shape. The above-mentioned "barrel shape" is a shape in which the outer diameter of the outer peripheral blade is the largest at the intermediate portion in the direction of the axis O, and the outer diameter gradually decreases toward both ends in the direction of the axis O.

In the end mill 1 of the present embodiment, the curvature radius of the rotation locus of the outer peripheral blade 5 (hereinafter also referred to as an outer circumference R) may be greater than the curvature radius of the rotation locus of the bottom blade 9 (hereinafter referred to as a leading end R). Therefore, the machining pitch of the outer peripheral blade 5 increases, and the machining efficiency is excellent.

Preferably, the outer circumference R is 20 times or more and 30 times or less of the leading end R. For example, when the leading end R is 0.5 mm to 3 mm, the outer circumference R is set in the range of 10 mm to 90 mm.

Further, the maximum diameter (a large end diameter) of the blade portion 3a and the blade length are appropriately set in accordance with a ratio between the leading end R and the outer periphery R or the like. For example, when the outer periphery R is 25 times the leading end R, the large end diameter is about 5 times the leading end R, and the blade length is about 10 times the leading end R.

As shown in FIG. 4, the rake angle in the radial direction (radial rake angle) $\alpha$ of the outer peripheral blade 5 is set to a negative angle of 0° or less in the cross-sectional view of the end mill main body 2 (cross-sectional view perpendicular to the axis O of the end mill main body 2). Thus, the strength of the cutting blade is improved, and fragment or chipping of the cutting blade can be easily suppressed, even when the hardness of the work material is high. Specifically, the radial rake angle $\alpha$ of the outer peripheral blade 5 is set to a value within the range of −20° or more and 0° or less. Preferably, the radial rake angle $\alpha$ of the outer peripheral blade 5 is a value within the range of −10° or more and −3° or less. More preferably, the radial rake angle $\alpha$ of the outer peripheral blade 5 is a value within the range of −10° or more and −5° or less. Further, an upper limit value and a lower limit value in the numerical range can be arbitrarily combined.

Here, the "radial rake angle of the outer peripheral blade 5" in the present specification refers to an angle $\alpha$ of acute angle, between an acute angle or an obtuse angle formed between a predetermined radial direction d0 passing through the outer peripheral blade 5 in the radial direction orthogonal to the axis O and the rake surface 11 of the outer peripheral blade 5 (a wall surface portion of the chip discharge groove 4 adjacent to the outer peripheral blade 5 facing the end mill rotation direction T), in the cross-sectional view of the end mill main body 2 shown in FIG. 4.

In the present embodiment, the radial rake angle $\alpha$ is defined as an angle formed by a straight line connecting the outer peripheral blade 5 and a position of the rake surface 11 of 4% inside of an outer diameter D from the outer peripheral blade 5 and the radial direction d0.

When the radial rake angle is "−(minus)", that is, a negative angle, the angle is an angle $\alpha$ when the rake surface 11 of the outer peripheral blade 5 extends obliquely to the opposite side to the end mill rotation direction T toward the radially outside, in the cross-sectional view of the end mill main body 2 shown in FIG. 4. In this case, the rake face 11 of the outer peripheral blade 5 is disposed in the end mill rotation direction T with respect to the predetermined radial direction d0.

If the radial rake angle $\alpha$ is less than −20°, since the sharpness of the outer peripheral blade 5 is reduced, sufficient finished surface quality cannot be obtained. In addition, cutting resistance increases and tool damage easily occurs. On the other hand, when the radial rake angle $\alpha$ exceeds 0°, the surface roughness (Rz) of the machined surface when the machining allowance increases is likely to be deteriorated, and the width of the machining condition is narrowed. In addition, since the strength of the cutting blade is lowered, fragment and chipping of the cutting blade easily occur when the hardness of the work material increases.

The flank surface of the outer peripheral blade preferably provides a minute second surface having a minute width from the outer peripheral blade to the side opposite to the end mill rotation direction T and a main second surface further to the side opposite to the end mill rotation direction T. By providing such a minute second surface, wear can be suppressed by the minute second surface, and an increase in the wear width can be suppressed.

Further, in a cross-sectional view of the end mill main body 2 shown in FIG. 4, when a circle (a web thickness circle) U inscribed in the chip discharge groove 4 is drawn around the axis O, a diameter (web thickness) Dw of the inscribed circle U is preferably 70% (0.7 D) or more and 85% (0.85 D) or less with respect to the outer diameter D of the outer peripheral blade 5. Still more preferably, the web thickness Dw is 75% or more and 85% or less with respect to the outer diameter D of the outer peripheral blade 5. More preferably, the web thickness Dw is 80% or more and 85% or less with respect to the outer diameter D of the outer peripheral blade 5. Further, the upper limit value and the lower limit value in the numerical range can be arbitrarily combined.

If the web thickness Dw is less than 70% of the outer diameter D of the outer peripheral blade 5, the rigidity of the end mill 1 is insufficient. As a result, undulation easily occurs in the finished surface due to vibration or collapse of the machining surface. When the web thickness Dw exceeds 85% with respect to the outer diameter D of the outer peripheral blade 5, the formation of the cutting blade is very difficult, and sufficient chip discharging performance cannot be obtained.

Further, in a side view of the end mill main body 2 shown in FIG. 2 (a side view when the end mill main body 2 is viewed from the radial direction orthogonal to the axis O), a twist angle (angle $\beta$) of the outer peripheral blade 5 is 20° or more. Preferably, the twist angle $\beta$ of the outer peripheral blade 5 is 40° or more. More preferably, the twist angle $\beta$ of the outer peripheral blade 5 is 40° or more and 50° or less. Further, the upper limit value and the lower limit value in the numerical range can be arbitrarily combined.

Here, the "twist angle" as referred to in this specification refers to an acute angle $\beta$ between the acute angle and the obtuse angle formed between the axis O (or a straight line parallel to the axis O) and the outer peripheral blade 5 (a helical wire of a twist) in the side view of the end mill main body 2 shown in FIG. 2.

When the twist angle $\beta$ of the outer peripheral blade 5 is less than 20°, because the cutting resistance is large, the surface roughness is deteriorated and a desired machining quality cannot be obtained. By setting the twist angle $\beta$ of the outer peripheral blade 5 to 40° or more, it is possible to obtain a good finished surface with a small surface roughness. However, if the twist angle $\beta$ of the outer peripheral blade 5 becomes too large, cutting resistance in the direction of the tool axis increases, and it is easy to induce abnormal vibration such as vibration. Therefore, the twist angle β of the outer peripheral blade 5 is preferably 50° or less.

In the end mill 1 of the present embodiment described above, the outer periphery R of the outer peripheral blade 5 is larger than the leading end R, the twist angle of the outer peripheral blade 5 is 20° or more, and the radial rake angle is set to the value of −20° or more and 0° or less. Thus, in addition to a reduction in the cutting load, the blade edge strength of the outer peripheral blade 5 can be improved. Therefore, high efficiency machining is enabled, and a high-quality finished surface can be obtained.

In addition, it is verified in the below-mentioned example that a good finished surface can be obtained by setting the twist angle and the radial rake angle of the outer peripheral blade 5 in the above range.

Moreover, the end mill 1 of the embodiment is equipped with the bottom blade 9 made up of a ball blade. Therefore, the wall surface finishing using the outer peripheral blade 5 and the corner finishing using the bottom blade 9 can be performed with one end mill, and the machining efficiency can be enhanced.

Example 1

Hereinafter, the result which verifies the effect of the present invention will be shown by an example.

In Example 1, a total of eight types of end mills of Examples 1 to 6 and Comparative Examples 1 and 2 were manufactured and subjected to machining tests.

As the end mills of Examples 1 to 6 and Comparative Example 2, an end mill having an oval shaped blade portion with the number of blades: 4, a leading end R: 2 mm, an outer periphery R: 50 mm, a large end diameter: 10 mm, a blade length: 18.7 mm, a neck length: 40 mm, a neck diameter: 9.5 mm and a shank diameter of 12 mm was produced.

As an end mill of Comparative Example 1, an end mill having a blade portion with the number of blades: 4, a leading end R (without a bottom blade): 2 mm, an outer periphery R: 85 mm, and a shank diameter: 10 mm was prepared.

The end mills of Examples 1 to 6 and Comparative Examples 1 and 2 all use a cemented carbide as a substrate, and a hard film is formed on the surface of the blade portion.

The measurement results of the specifications of the end mills of Examples 1 to 6 and Comparative Examples 1 and 2 are shown in the following table. The measurement of the outer periphery R and outer peripheral blade twist angle used the optical microscope. The measurement of the outer peripheral blade rake angle and the web thickness was performed at a position of 5 mm from the leading end, using an optical noncontact three-dimensional measurement device.

TABLE 1

| | Outer periphery R | Outer periphery twist angle | Outer periphery rake angle | Web thickness |
|---|---|---|---|---|
| Example 1 | 50 mm | 45° | −7.5° | 80% |
| Example 2 | 50 mm | 45° | −3.7° | 80% |
| Example 3 | 50 mm | 45° | −10.9° | 80% |
| Example 4 | 50 mm | 30° | −7.1° | 80% |
| Example 5 | 50 mm | 45° | −15.9° | 83.5% |
| Example 6 | 50 mm | 45° | −6.3° | 65% |

TABLE 1-continued

| | Outer periphery R | Outer periphery twist angle | Outer periphery rake angle | Web thickness |
|---|---|---|---|---|
| Comparative Example 1 | 85 mm | 17° | −1.6° | 66% |
| Comparative Example 2 | 50 mm | 45° | 2.2° | 75% |

Next, a machining test of a high hardness steel (YXR3 (58 HRC) manufactured by Hitachi Metals, Ltd.) was performed, using the end mills of Examples 1 to 6 and Comparative Examples 1 and 2. The machining conditions are as follows.

Rotation speed n: 4780 min$^{-1}$ (Vc=150 m/min)

Feeding speed Vf: 1924 mm/min (fz=0.1 mm/t)

Axial depth ap: 0.5 mm

Radial depth ae: 0.3 mm

Machine main shaft: HSK-A63

Holder: Shrink fit 2 piece holder

Cooling: Air blow

Machining method (machining shape): Contouring (gradient surface with a 9° inclination angle)

The surface roughness Rz of the surface of the work material machined using each end mill was measured. The measurement results are shown in Table 2. In Table 2, the surface roughness in the "feed direction" is the surface roughness of the surface of the work material along the tool traveling direction at the time of contour machining, and in the case of this embodiment, it is a surface roughness along the horizontal direction of the vertical wall of the work material. The "axial" surface roughness is a surface roughness of the surface of the work material along the tool axis direction at the time of contour machining, and in the case of the embodiment, it is a surface roughness along a height direction of the vertical wall of the work material.

TABLE 2

| | Surface roughness (Rz: μm) ae: 0.3 mm | |
|---|---|---|
| | Feed direction | Axial direction |
| Example 1 | 1.2 | 1.7 |
| Example 2 | 1.3 | 2.7 |
| Example 3 | 2.2 | 3.0 |
| Example 4 | 2.7 | 1.5 |
| Example 5 | 2.7 | 3.6 |
| Example 6 | 3.2 | 2.5 |
| Comparative Example 1 | 4.3 | 2.0 |
| Comparative Example 2 | 4.8 | 3.0 |

As shown in Table 2, in the end mills of Examples 1 to 6 in which the twist angle of the outer peripheral blade is set to 20° or more and the rake angle of the outer peripheral blade is in the range of −20° to 0°, the surface roughness in the feed direction was significantly improved as compared to the end mills of the comparative example. This is because the cutting resistance is dispersed and the component of force in the feed direction is reduced by increasing the twist angle with respect to the comparative example.

In addition, in the end mills of Examples 1, 2, 4 and 6 in which the rake angle of the outer peripheral blade is set to −10° or more and −3° or less, the cutting resistance generally tends to decrease as compared to the end mill with a rake angle of −10° or less, and in the axial surface roughness as well, results equal to or better than the end mill of the comparative example were obtained, and the end mill having the finished surface of higher quality was provided. Furthermore, in the end mills of Examples 1 and 4 in which the rake angle of the outer peripheral blade was set to −10° or more and −5° or less, the finished surface of the highest quality was obtained.

Example 2

In Example 2, semi-finishing and finishing in 5-axis machining using a real die were evaluated. The machining shape was a side gear shape with a size of about 90 mm and a machining depth of 30 mm. Further, YXR33 (58 HRC) manufactured by Hitachi Metals, Ltd. was used as the work material.

In the roughing, after the side gear shape was machined, and the bottom surface was finished. Further, using the end mill according to the present embodiment and the ball end mill of related art, a sloped surface and a fillet portion (connecting surface) were semi-finished and finished.

In the semi-finishing, fillet portions other than the shape inside and bottom were machined. In the finishing process, the shape inside and bottom fillet portions were machined. In all cases, the cooling method was air blow.

Table 3 shows the tool shapes used in the semi-finishing process. Table 4 shows the machining conditions in the semi-finishing process. In addition, the machining conditions of the ball end mill of related art are conditions generally used. The condition of this example was a condition in which the pitch was doubled as compared to the machining of the ball end mill of related art.

TABLE 3

|  | Leading end R | Outer periphery R | Outer periphery twist angle | Outer periphery rake angle | Web thickness | Tool diameter | Blade length |
| --- | --- | --- | --- | --- | --- | --- | --- |
| Present example | 2 mm | 50 mm | 45° | −5.2° | 80% | 10 mm | 18.70 mm |
| Comparative example | 2 mm | 2 mm | 30° | −12° | 75% | 4 mm | 6.0 mm |

TABLE 4

|  |  | Rotational speed n (min$^{-1}$) | Feed speed Vf (m/min) | Pitch (mm) | Machining allowance (mm) | Machining time (min) |
| --- | --- | --- | --- | --- | --- | --- |
| Present example | Outer peripheral blade | 10560 | 1440 | 0.6 | 0.1 | 46 |
|  | Bottom blade | 15900 | 2060 | 0.15 | 0.1 |  |
| Comparative example | R blade | 10560 | 1580 | 0.3 | 0.1 | 75 |

Table 5 shows the tool shape used in the finishing process. Table 6 shows the machining conditions in the finishing process. In addition, the machining conditions of the ball end mill of related art are conditions generally used. The condition of this example was a condition in which the pitch was made larger than that of the ball end mill of related art.

TABLE 5

|  | Leading end R | Outer periphery R | Outer periphery twist angle | Outer periphery rake angle | Web thickness | Tool diameter | Blade length |
| --- | --- | --- | --- | --- | --- | --- | --- |
| Present example | 1.5 mm | 37.5 mm | 45° | −5.5° | 80% | 7.5 mm | 14.03 mm |
| Comparative example | 1.5 mm | 1.5 mm | 30° | −11° | 75% | 3.0 mm | 4.5 mm |

TABLE 6

| | | Rotational speed n (min⁻¹) | Feed speed Vf (m/min) | Pitch (mm) | Machining allowance (mm) | Machining time (min) |
|---|---|---|---|---|---|---|
| Present example | Outer peripheral blade | 11370 | 1640 | 0.5 | 0.05 | 92 |
| | Bottom blade | 18500 | 1800 | 0.7 | 0.05 | |
| Comparative example | R blade | 14300 | 1720 | 0.4 | 0.05 | 125 |

In the machining method of related art that uses the ball end mill of related art, 200 minutes are required for the semi-finishing and the finishing together. On the other hand, by using the end mill of the present example, the combination of the semi-finishing process and the finishing process was 138 minutes.

Moreover, as for the machining surface that uses the ball end mill of related art, Ra was 0.624 μm and Rz was 3.379 μm. On the other hand, the machined surface using the present example had an Ra of 0.515 μm and an Rz of 2.574 μm. Improvements in machining time and surface were achieved at a high level using the end mill of this example.

Further, the present invention is not limited to the embodiments described above, and various modifications can be made without departing from the spirit of the present invention.

For example, in the above embodiment, the four-blade end mill 1 in which four (four sets of) cutting blades are provided in the blade portion 3a of the end mill main body 2 has been described, but the present invention is not limited thereto. For example, it may be a two-blade end mill 1 in which two (two sets of) cutting blades are provided in the blade portion 3a of the end mill main body 2, a sixth-blade end mill 1 in which six (six sets of) cutting blades are provided in the blade portion 3a of the end mill main body 2.

In addition, without departing from the spirit of the present invention, each configuration (component) described in the above-described embodiment, modified examples, and note may be combined, and addition, omission, replacement, and other changes of the configuration can be made. Furthermore, the present invention is not limited by the embodiments described above.

REFERENCE SIGNS LIST

1 End mill
2 End mill main body
4 Chip discharge groove
5 Outer peripheral blade
9 Bottom blade
D Outer diameter
d0 Diameter direction
Dw Web thickness
Dw Diameter (Web thickness)
O Axis

What is claimed is:

1. An end mill comprising:
an end mill main body;
four chip discharge grooves extending from a leading end to a trailing end in an axial direction of the end mill main body;
four bottom blades, each of which has a rake surface and a flank surface, and are provided at a leading end portion in the axial direction of the end mill main body and have spherical shapes in which rotation loci around an axis have centers on the axis;
four gashes which are formed at the leading end portion in the axial direction of the end mill main body and each of which is adjacent to one of the four bottom blades; and
four outer peripheral blades each of which has a rake surface and a flank surface, and each of which is provided along each of the chip discharge grooves, and in which rotation loci around the axis are convex outward,
wherein
the end mill has a shape in which outer diameters of the outer peripheral blades decrease toward the leading end portion in the axial direction,
a curvature radius of the rotation locus of each of the outer peripheral blades is larger than a curvature radius of the rotation locus of each of the bottom blades,
the curvature radius of the rotation locus of each of the outer peripheral blades is 20 times or more and 30 times or less than the curvature radius of the rotation locus of each of the bottom blades,
the curvature radius of the rotation locus of each of the bottom blades is 0.5 mm to 3 mm,
a twist angle of each of the outer peripheral blades is 40° or more and 50° or less,
a rake angle in a radial direction of each of the outer peripheral blades in a cross section orthogonal to the axis is −10° or more and −5° or less,
a web thickness of each of the outer peripheral blades is 75% or more and 85% or less of an outer diameter of each of the outer peripheral blades, and
the four bottom blades include two first bottom blades and two second bottom blades,
the two first bottom blades and the two second bottom blades have different blade lengths along the radial direction from each other, and
the gash adjacent to one of the two first bottom blades and the gash adjacent to one of the two second bottom blades form a ridgeline being a boundary where the two gashes meet, and
the ridgeline extends along the radial direction between one of the two first bottom blades and one of the two second bottom blades at the leading end portion of the end mill main body.

2. The end mill according to claim 1, wherein a portion of the end mill with the four outer peripheral blades and the four bottom blades is oval shaped.

* * * * *